United States Patent [19]
Gottliebson et al.

[11] 3,751,185
[45] Aug. 7, 1973

[54] MANOMETER CONTROL

[75] Inventors: Mayo Gottliebson; Charles Faes, both of Corvallis, Oreg.

[73] Assignee: Flomatcher Co., Inc., Corvallis, Oreg.

[22] Filed: Oct. 4, 1971

[21] Appl. No.: 186,043

[52] U.S. Cl............ 417/7, 73/299, 73/321, 137/395, 137/403, 417/36
[51] Int. Cl............................................ F04b 41/06
[58] Field of Search............ 137/403, 624.17, 137/424, 386, 395, 403, 424, 624.17; 73/299, 302, 401, 308, 313, 321, 318, 395; 417/7, 8, 36

[56] References Cited
UNITED STATES PATENTS

| | | | |
|---|---|---|---|
| 2,695,030 | 11/1954 | Rice | 137/428 X |
| 2,520,797 | 8/1950 | Buss et al. | 137/424 X |
| 2,984,109 | 5/1961 | Savage et al. | 73/395 X |
| 3,307,585 | 3/1967 | Schilling et al. | 137/624.17 X |
| 2,708,256 | 5/1955 | Colt | 73/321 X |
| 3,500,863 | 3/1970 | Wilson | 137/624.17 |

Primary Examiner—Robert G. Nilson
Assistant Examiner—Edward Look
Attorney—Stephen W. Blore et al.

[57] ABSTRACT

A liquid manometer control has a reservoir connected to a source of air pressure and to a bubbler tube, the lower end of which projects into the liquid within a wet well. A vented float tube extends upwardly from an open lower end within the reservoir and contains a float which moves upon fluctuations in liquid level within the float tube as determined by changes in the level of liquid in the wet well. A counterweighted chain connected to the float translates float movement via sprockets and chain to rotary motion of a cam wheel or drum having cam-type actuators on its periphery. These cams actuate switches or potentiometers which in turn provide pilot signals for starting and stopping pumps, controlling the speed of pumps, opening and closing valves and operating other devices as desired, as a function of the liquid level in the wet well. In an illustrated embodiment, the liquid level in the wet well determines the level of liquid in the float tube, which in turn controls the starting and stopping of a pair of pumps and the level of liquid in a liquid rheostat to determine the speed of one of such pumps. The pumps in turn control the level of liquid in the wet well.

14 Claims, 5 Drawing Figures

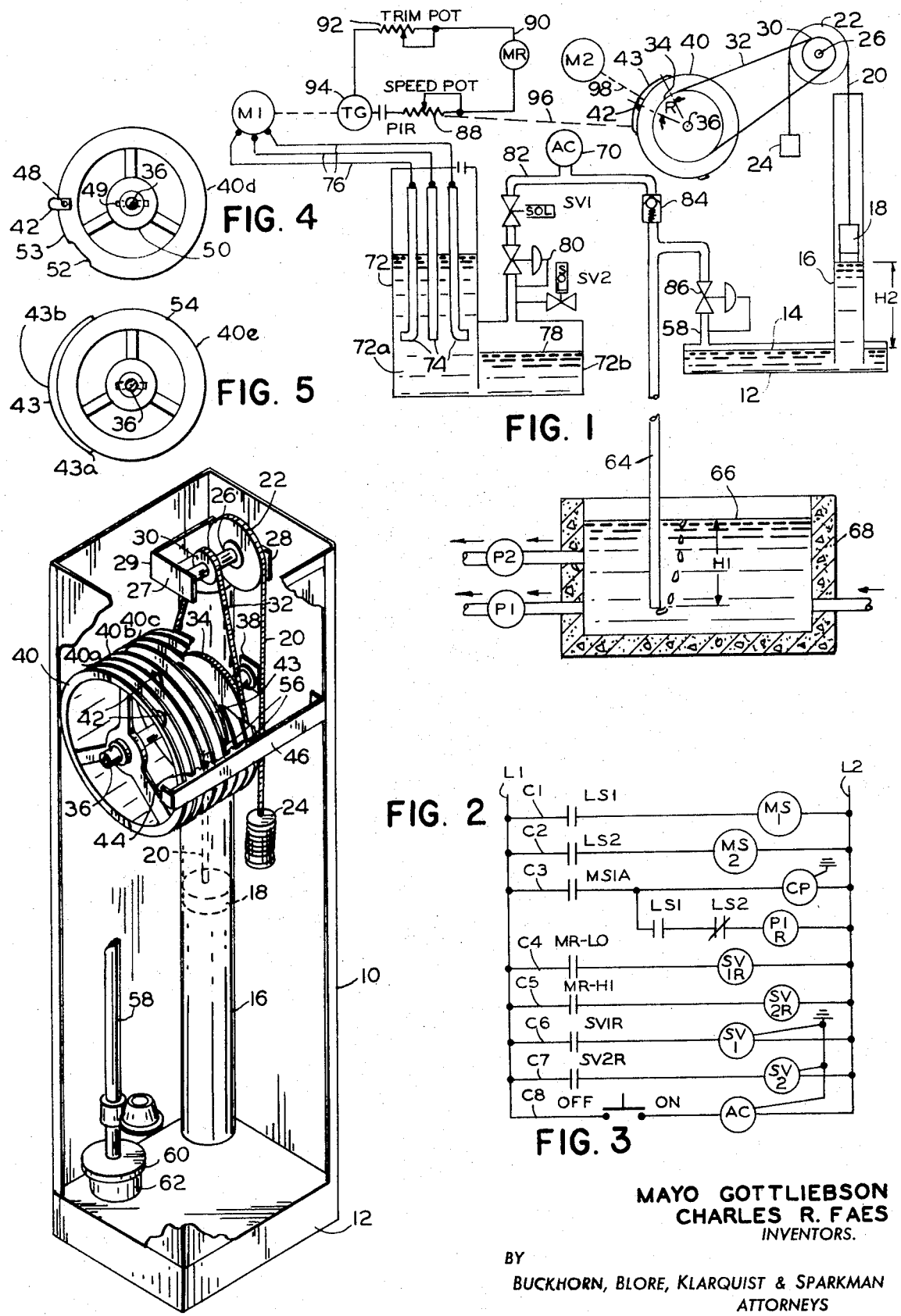

MANOMETER CONTROL

BACKGROUND OF THE INVENTION

1. Field of the Invention

The present invention relates to a liquid manometer control device to provide signals to control the operation of pumps, valves, potentiometers and other desired functions.

2. Description of the Prior Art

It is suspected that manometer-type controls have been used before within wet wells to control the operation of switches which in turn control the operation of pumps to control the level of liquid in the same wet well. However, such prior manometer controls have disadvantages in that the manometer liquid in such cases is the same liquid that is present in the wet well, and the latter liquid may be highly corrosive or contaminated and therefore hard on the control equipment, such as in the case of industrial and domestic sewage effluent.

Also, although manometer-actuated controls may have been used to operate switches so as to start and stop motors, it is believed that such controls in the past have been limited to such application.

SUMMARY OF THE INVENTION

According to the present invention, a liquid manometer control device is provided which has a wide application not only to the actuation of switches or contact closures for starting and stopping motors or opening and closing valves, but also to effect resistance changes in potentiometers and the like so as to provide variable signals to control the speed of variable speed electric motors and other variable functions.

The device is basically a large-scale liquid manometer having means to convert remote wet well liquid level changes into a mechanical force to drive cam-type actuators which actuate electrical signal-producing devices such as limit switches and potentiometers, to control one or many constant and variable speed pumps or related functions.

According to a primary feature of the invention, the manometer control device may be maintained at a site remote from the means or function to be controlled, such as the level of a liquid in a wet well.

According to another feature of the invention, a pneumatic controller is used to produce a pressure signal in the reservoir of the manometer control proportional to the condition of the means to be controlled such as the depth of liquid in the wet well. In an illustrated embodiment, the pneumatic controller is a bubbler tube which is used to sense the level of liquid in a wet well and produce an air pressure signal at the manometer reservoir which varies with such level so that the level of liquid in the manometer tube is proportional to the level of liquid in the wet well. Fluctuations in the level of liquid in the wet well and thus in the manometer tube are then translated into movement of a switch-actuating or resistance-changing device through a mechanical drive from the float.

Another feature includes cam-type actuators which can actuate switches, potentiometers and other control signal-producing devices and which are adjustable to control all or any selected part of the range of the means or function to be controlled and to provide a precise differential between "on" and "off" position.

In another feature of the invention, the manometer liquid is segregated from the wet well liquid and may, in fact, be a different liquid of a noncorrosive and nonevaporative nature.

A primary object of the invention is to provide a manometer control device having a wide variety of control applications.

Another primary object of the invention is to provide a manometer control device which can be situated remote from the means to be controlled.

Still another primary object of the invention is to provide a manometer control having its own liquid manometer reservoir which is independent of the wet well, sump, liquid or other function to be controlled.

A further object is to provide a control liquid which is separate and independent of the controlled liquid and which may be of a different nature than the controlled liquid.

Another object is to provide a manometer control which utilizes a pneumatic controller to sense the condition of a means or function to be controlled and to produce a pneumatic output pressure signal at the manometer reservoir which varies with variations in the condition of the controlled means or function.

BRIEF DESCRIPTION OF THE DRAWINGS

The foregoing and other objects and advantages of the present invention will become more apparent from the following detailed description which proceeds with reference to the accompanying drawings wherein:

FIG. 1 is a schematic view of a control system incorporating a manometer control in accordance with the invention;

FIG. 2 is a perspective view of the manometer control of FIG. 1 with portions of the casing of such control broken away to reveal the interior details of the control;

FIG. 3 is a diagram of a suitable electrical control circuit for the control system of FIG. 1;

FIG. 4 is an end view of an "on-off" cam wheel used in the control of FIG. 2; and FIG. 5 is an end view of a "variable speed" cam wheel used in the control of FIG. 2.

With reference to the drawing, FIG. 2 discloses a manometer control unit in accordance with the invention. The unit includes a free-standing, floor-mounted housing 10, the base of which forms an airtight reservoir 12 for the manometer liquid 14 shown in FIG. 1. An open manometer or float tube 16 extends upwardly from one corner of the reservoir, and has a lower end opening below the level of liquid 14 within reservoir 12. The cylindrical float tube 16 contains a float 18 sized so that it can move freely vertically within the tube 16 upon fluctuations in the level of manometer liquid within the tube.

A float chain 20 trained about a sprocket 22 above tube 16 is connected at one end to float 18 and at the other end to a counterweight 24 alongside the tube. Sprocket 22 is fixed to a stub shaft 26 rotatably mounted at its opposite ends in bearings on legs 27, 28 of a U-shaped bracket 29 fixed to one side of casing 10. Stub shaft 26 carries a second, smaller sprocket 30. An endless chain 32 trained about sprocket 30 transmits rotary motion of shaft 26 to a larger sprocket 34 fixed to a cam shaft 36.

Cam shaft 36 is rotatably mounted at its opposite ends in bearings 38 mounted on opposite sidewalls of casing 10. A cam wheel assembly 40 is fixed to shaft 36. Cam wheel assembly 40 is made up of a series of separate cam wheels 40a, 40b, 40c and so on which are selectively joined together in the quantity required to serve the number of functions to be controlled.

Each cam wheel 40 mounts at least one actuator cam 42 or 43. As shown best in FIGS. 4 and 5, the actuator cams of the illustrated control are of two general types. Cam wheel 40d of FIG. 4 mounts an "on-off" type cam actuator 42 at its periphery. This cam is particularly adapted to actuate a microswitch, such as one of microswitches 44 mounted on a switch bar 46 on an inside wall of casing 10, to start and stop a pump motor. Cam 42 can be reset at any circumferential position on wheel 40d by loosening set screws 48. Further adjustment can be obtained by resetting cam wheel 40d on cam shaft 36 by loosening set screws 49 on wheel hub 50.

Cam wheel 40d also includes a depressed rim portion 52 separated from cam 42 by a normal rim portion 53. This actuator arrangement is designed to actuate a differential-type microswitch. If the microswitch button is in register with the depressed rim portion, the switch is open. It remains open even as the wheel rotates and the switch button rides up on rim 53, and does not close until depressed by cam 42. Thereafter the switch remains closed until the switch button again enters depression 52. The arc defined by the peripheral distance between cam 42 and the beginning of depression 52 is designated the "on-off" differential. The number of "on-off" type cam wheels used will depend on the number of different pumps or other functions to be controlled.

Cam wheel 40e of FIG. 5 mounts a variable speed type cam 43 on its rim. This cam defines a sort of inclined plane on rim 54, beginning at one end 43a at a very small rise above rim 54, representing a minimum speed condition, and gradually increasing in its radial distance from the rim, reaching a maximum at 43b, representing a maximum speed condition.

Speed cams 43 as described can be mounted on rim 54 in different combinations to produce various desired speed characteristics. The illustrated wheel 40e mounts two such cams back to back to produce a gradually increasing speed followed by a gradually decreasing speed characteristic.

Speed cams 43 are designed to operate precision linear plunger-actuated potentiometers, such as potentiometers 56 mounted on bar 46 in FIG. 2, to produce resistance changes in them and thus electrical signals proportioned to any change of liquid level in the float tube in predetermined increments. These signals can then be used to control, indirectly, the speed of variable speed motors and their connected pumps by controlling the liquid level in a liquid rheostat in a manner to be described. The number of speed cams used will depend, of course, on the number of different variable speed functions to be controlled and the speed ranges required.

With the foregoing described "on-off" and "variable speed" cams, any number of "on-off" operations and variable speed functions and ranges can be accomodated, limited only by the physical dimensions of the control unit.

Rather than being mounted on separate wheels, the various cams could be mounted on the periphery of a common drum, with means provided for adjusting the circumferential positions of the cams on the drum.

Referring again to FIGS. 1 and 2, the control also includes an air tube 58 opening into the upper end of reservoir 12 through a liquid filler cap 60 covering a filler tube 62. Air tube 58 has a suitable coupling (not shown) at an external wall portion of casing 10 for connecting the air tube to a bubbler tube system as shown in FIG. 1.

The bubbler tube system includes a vertical bubbler tube section 64 which extends at its open lower end into the liquid 66 of a wet well or sump 68, the level of such liquid being the means or condition to be controlled. The bubbler tube is connected to an air compressor 70 which supplies aa positive air pressure to the bubbler tube to prevent the sump liquid from entering the lower end of the tube and for purging any foreign material from the tube. The air compressor also supplies air to the top of manometer reservoir 12 through tube section 58. Any change in the depth of the bubbler tube 64 below the surface of the sump liquid caused by a change in the liquid level in the sump is transmitted via pneumatic pressure signal through bubbler tube 64 and tube section 58 to the reservoir 12 of the manometer control and will thereby result in a proportional change in the height of manometer liquid 14 in float tube 16. When the wet well liquid and the manometer liquid are the same, that is, have the same specific gravity, the depth $H_1$ of the bubbler tube in the sump liquid must equal the vertical distance $H_2$ between the surface of the manometer liquid in the float tube and the surface of the same liquid in the manometer reservoir. In such instances, changes in wet well liquid level will effect a change in float tube liquid level in a 1:1 ratio.

However, the manometer liquid can be different than the wet well liquid, and in fact, in most cases such as when the wet well is handling a corrosive liquid or water, this, of course, is highly desirable to prevent corrosion of the control elements and evaporation of the control liquid. Suitable liquids for the control other than water would include ethylene glycol, mercury, or mineral oil, as well as many others. In instances where liquids are used in the manometer tube having a different specific gravity than the wet well liquid, the manometer control elements can be dimensioned to compensate for differences in specific gravities.

For example, in a test prototype of the control, mineral oil was used as the manometer liquid to eliminate evaporation and corrosion. Components were sized so as to provide 330° rotation of the cam wheel for a change in liquid level in the wet well of 1, 2, 3, 4 or 6 feet, as required for the application. The sprocket sets described are adapted to be field interchangeable to permit changes of ratio at any time after installation. Each one inch of cam wheel arc length represented ¼ inch, ½ inch, ¾ inch, 1 inch and 1 and ¼ inches of change of liquid level in the float tube, depending on the sprocket set employed.

In FIG. 1 the manometer control is applied to control the depth of liquid in the wet well by controlling the starting and stopping of two pumps, including a primary pump $P_1$ driven by a variable speed electric motor $M_1$ and an auxiliary pumpp $P_2$ driven by a constant speed electric motor $M_2$. Both pumps pump effluent from wet well 68.

The manometer control also controls, indirectly, the speed of pump $P_1$ by controlling directly the level of liquid in a liquid rheostat. Rheostat 72 may be of the general type described in greater detail in, for example, prior U. S. Pats. Nos. 3,021,789 and 3,424,090. Such rheostat includes an electrode chamber 72a with electrodes 74 and an electrolyte chamber 72b. Electrodes 74 are connected by conductors 76 to the secondary windings of wound-rotor motor $M_1$. The length of electrodes 74 covered by electrolyte 78 in electrode chamber 72a determines the speed of motor $M_1$ and thus the speed of pump $P_1$. With only a small portion of the electrodes covered, resistance in the rotor windings is high, causing the motor to operate at low speed. As the depth of the electrodes in electrolyte increases, resistance decreases and motor speed increases.

Electrolyte chamber 72b is connected to air compressor 70 through a positive-purge valve 80 and a solenoid-actuated air-supply valve $SV_1$ in a tube section 82. Tube section 82 also includes a solenoid-actuated vent valve $SV_2$. Tube 82 also connects electrolyte chamber 72b to bubbler tube 64 through a spring-loaded check valve 84. Check valve 84 is adjusted to maintain upstream air pressure at a level sufficient to cause the electrolyte 78 to cover at least a portion of the electrodes 74, regardless of the downstream pressure in bubbler tube 64. This enables the rheostat to operate over its entire control range when the liquid level in the wet well is near the bottom of the bubbler tube.

Air tube 58 leading to the manometer has a positive-purge valve 86 similar in operation and purpose to valve 80 for the rheostat. These valves 80, 86 prevent overflow of liquid from their electrode chamber and float tube, respectively, when bubbler tube pressure becomes abnormally high because of an exceptionally high level of liquid in sump 68. Under such high level conditions, these valves close, isolating the rheostat and manometer reservoirs from such high air pressures. However, the positive purge valves reopen automatically after the liquid level in the wet well returns to its normal range. The construction, function and operation of these valves are disclosed in greater detail in prior U. S. Pat. No. 3,424,090.

As previously mentioned, a potentiometer actuated by an inclined plane cam 43 on one of the cam wheels 40 determines the speed of pump motor $M_1$. It does this indirectly by controlling the level of electrolyte in electrode chamber 72a of liquid rheostat 72. This "speed" potentiometer is indicated at 88 in a meter relay circuit 90 in FIG. 1. Such circuit also includes the meter relay MR, an adjustment or "trim" potentiometer 92, a normally open relay contact PIR operated by an adjustment potentiometer relay PIR shown in the electrical control diagrams of FIG. 3, and a voltage or "tach" generator 94 for generating a voltage signal in the circuit of trim potentiometer 92 proportional to the speed of motor $M_1$.

As indicated by dashed line 96, movement of cam 43 on a cam wheel 40, upon changes in the level of liquid in float tube 16, varies the resistance of speed potentiometer 88 to change the speed of motor $M_1$ in a manner described below. However, as indicated by dashed line 98, the on-off cams 42 of cam wheels 40 actuate on-off limit switches to control the start and stop functions of both motors $M_1$ and $M_2$.

A control circuit diagram for a typical operating sequence of motors $M_1$ and $M_2$ is shown in FIG. 3. Such control circuitry includes primary electrical supply lines $L_1$ and $L_2$ and eight control circuits represented by lines $C_1$ through $C_8$.

OPERATION

To energize the control system of FIG. 1, the on-off switch of circuit $C_8$ in FIG. 3 is closed. This energizes a relay which starts air compressor AC. Air is continuously discharged from the air compressor into the bubbler tube 64 and from the bubbler tube into the liquid in wet well 68. The lower end of the bubbler tube is positioned at the bottom of the operating range of the wet well. At the same time air under a pressure determined by the pressure head of liquid at the lower end of the bubbler tube is transmitted through tube 58 and its positive purge valve 86 into manometer reservoir 12.

The manometer liquid is free to move from sealed reservoir 12 to vented float tube 16 and vice versa. Thus changes in the liquid level in the wet well effect a proportionate change in the liquid level in the float tube. The float moves with fluctuations in the float tube liquid level, and motion of the float is transmitted through the chains and sprockets previously described, to the cam wheels 40 and finally to cams 42, 43. The settings of these cams on the peripheries of their respective wheels determine which limit switches, potentiometers or other signal-producing means are actuated and when. In the case of speed cams 43, the settings also determine to what extent actuation occurs. In this manner, the operating program can be adjusted to include the entire wet well range above the end of the bubbler, to a height not exceeding the length of the float tube, or can be adjusted to include any portion of the wet well range. Thus, depending on the physical size of the manometer control and the number of cams and cam wheels, and the length and configuration of the inclined plane cams, any number of on-off operations and variable speed control ranges, in increments, can be controlled. Also, on-off differentials can be accomodated and precisely regulated using a cam wheel 40d and cam 42.

In the illustrated simple control system of FIGS. 1 and 3, the on-off functions of only two pumps $P_1$ and $P_2$ are controlled, and only the speed of one such pump $P_1$ is regulated by the manometer control.

With the on-off switch of FIG. 3 closed and the air compressor operating, neither pump motor $M_1$ or $M_2$ operates until a corresponding on-off cam 42 on a cam wheel actuates a corresponding limit switch LS1 or LS2 on switch bar 46. This, for example, might be the situation with the liquid level in the wet well at or near the lower end of the bubbler tube. Under this condition, both solenoid valves SV1 and SV2 are closed, isolating the liquid rheostat from the air compressor and maintaining the electrolyte level in the rheostat at a locked-in, preset, constant level.

Now assuming that the liquid level in the wet well begins to rise, the level of liquid in the float tube rises a proportionate extent, raising the float and consequently turning cam wheels 40. Depending on the adjustment of on-off cam 42 on wheel 40d, a predetermined rise of liquid in the wet well and float tube causes a limit switch LS1 on the switch bar to ride up from cam wheel rim depression 52 and over rim 53 until the switch is depressed by cam 42 through rotation of cam wheel 40d through the on-off differential arc shown in FIG. 4. This closes the LS1 contacts in circuits $C_1$ and $C_3$. The closing of contact LS1 in circuit $C_1$ energizes relay MS1 to start motor $M_1$ and thus pump $P_1$ operating at a constant speed as determined by the locked-in electrolyte level in the rheostat chamber 72a. Relay MS1 also closes contact MS1A to complete circuit C3 and thus energize relay P1R. This relay closes contact P1R in the meter relay circuit of FIG. 1 to complete this circuit and condition the meter relay MR for operation.

Assuming the wet well liquid level continues to rise to an extent such that the low speed portion of speed cam 43 on cam wheel 40e begins to actuate the speed potentiometer 88, the needle of such potentiometer moves to cause a resistance increase, thereby reducing current flow through the meter relay MR and causing relay contact MR-LO to close in circuit C4. With circuit C4 complete, relay SV1R closes the SV1R contact in circuit C6, energizing the SV1 solenoid to open valve SV1. Thus air tube 82 connects the electrolyte chamber 72b of the rheostat with air pressure as determined by air compressor 70 and the setting of spring-loaded check valve 84. As a result, the level of electrolyte in the electrode chamber begins to rise, covering more of electrodes 74 and reducing resistance in the secondary windings of motor M1, thereby increasing the speed of such motor. The increased speed of motor M1 increases the voltage output of tach generator 94 in the meter relay circuit and thus the current flow through the meter relay circuit.

The level of electrolyte in the electrode chamber continues to rise to increase motor speed until the current flow through the meter relay MR reaches its former level, at which point relay contact MR-LO reopens. When contact MR-LO reopens, solenoid valve SV1 recloses, locking the increased electrolyte level into the electrode so that motor M1 runs at an increased constant speed which continues until the liquid level in the wet well again fluctuates.

If the wet well liquid level rises again, the foregoing-described cycle repeats to increase the speed of motor M1 in another increment. The speed of motor M1 can increase to a maximum determined by the point 43b on speed cam 43. Should the liquid in the sump continue to rise with pump P1 operating at maximum speed, limit switch LS2 is actuated by another on-off type cam 42 to close contact LS2 in circuit C2 and energize relay MS2 to start the constant speed motor and pump set M2 and P2. Motor and pump set M1 and P1 continue to operate at maximum speed under such condition despite contact LS2 in circuit C3 opening, because contact LS1 in circuit C1 remains closed.

If the level of liquid in the sump drops with pump P1 operating at a high speed and with pump P2 not operating, the liquid level in the float tube undergoes a proportionate drop, moving the float and turning the speed cam in a direction to reduce the resistance in speed potentiometer 88. The reduced resistance causes an increased current flow through meter relay MR which causes contact MR-HI to close in circuit C5. Relay SV2R is thereby energized to close contact SV2R in circuit C7 and open solenoid vent valve SV2 in air tube 82. This vents air from electrolyte chamber 72b and thus reduces the level of electrolyte in the electrode chamber. As a result, resistance in the rotor windings of motor M1 increases to slow the speed of the motor and its connected pump P1. As the motor slows down, the voltage output of tach generator 94 decreases, reducing the current flow through the meter relay circuit until current flow through relay MR returns to normal. At this point, meter relay MR reopens the MR-HI contact, reclosing the SV2R solenoid vent valve. The electrolyte in the electrode chamber is now locked in at its lowered level to maintain the pump P1 operating at its reduced constant speed until another fluctuation in wet well liquid level occurs.

The foregoing describes the operation of the manometer control in a simple control program in conjunction with a liquid rheostat to produce incremental speed changes in one pump as well as on-off control of that pump and a second, constant-speed pump.

Mechanical stops (not shown) could be provided to restrict float travel for applications in which the entire pump-operating program is to be accomplished in less than the maximum possible float travel. In such cases the bottom of the operating program can be located above the bottom of the bubbler pipe. Lost motion devices in the mechanical transmission from the float to the cam wheels can also be included where required or desired as a means of regulating incremental changes in control signals.

Having illustrated and described what is now a preferred embodiment of our invention as well as a simplified application thereof, it should be apparent to persons skilled in the art that the same permits of modification in arrangement, detail and application. We claim as our invention all such modifications as come within the true spirit and scope of the following claims.

We claim:

1. In a control system for controlling multiple operating functions of a controlled system including at least one variable operating function, a wet well having a fluctuating liquid level, a liquid manometer control including a float tube and a float movable within said tube upon changes in the level of liquid within said tube, pneumatic controller means operably interconnecting said wet well and said manometer control in a manner so as to provide changes in the level of liquid in said float tube proportional to fluctuations in the liquid level in said wet well, rotatable control wheel means, drive means operably interconnecting said float and said control wheel means and providing predictable rotative movement of said control wheel means upon movement of said float within said tube, multiple actuator means on the periphery of said control wheel means, multiple control signal producing means positioned adjacent said wheel means, each of said multiple actuator means being positioned on said wheel means for engagement with and actuation of a preselected one of said control signal producing means during a predetermined rotative position of said wheel means, a plurality of controlled functions controlled by signals from said multiple signal producing means, at least one of said controlled functions comprising a variable controlled function, at least one of said control signal producing means being operable to produce a variable control signal for controlling said variable controlled function, and at least one of said actuator means comprising a variable surface cam-type actuator for engaging and moving a variable position operating means of said variable control signal producing means and thereby producing a variable control signal, whereby the variable operating characteristics of said variable controlled function are controlled by the surface configuration and position of said variable surface cam actuator.

2. A control according to claim 1 wherein said wheel means comprises a series of separate wheel members mounted on a common shaft, each said wheel member including at least one said actuating means mounted on the rim of said wheel member.

3. A control system according to claim 1 wherein said variable controlled function comprises the variable speed of a variable speed motor.

4. A control system according to claim 1 wherein said variable controlled function comprises the variable speed of a variable speed electric motor and said variable control signal-producing means comprises a potentiometer means operable to produce a variable current in an electrical control circuit for said motor.

5. A control system according to claim 4 wherein one of said signal-producing means comprises switch means for controlling the on-off function of said variable speed electric motor, said switch means including a switch-operating means engageable with one of said actuator means.

6. A control system according to claim 4 including pump means for pumping water from said wet well, said variable speed electric motor being operable to drive said pump means.

7. A control system according to claim 1 wherein said variable controlled function comprises the variable resistance of a rheostat means, a wound rotor electric motor having secondary windings operably connected to said variable resistance of said rheostat means so that changes in said variable resistance causes a corresponding change in the speed of said electric motor, rheostat operating means for changing said variable resistance of said rheostat means in response to changes in a variable condition, means for activating and deactivating said rheostat operating means in response to variable signals from said variable control signal-producing means as actuated by said variable surface cam actuator, whereby the speed of said electric motor is determined directly by said manometer control and only indirectly by said variable condition.

8. A control system according to claim 7 wherein said rheostat means comprises a liquid rheostat, said variable condition comprises the variable liquid level in said wet well, said rheostat operating means comprises a pneumatic controller means operably interconnecting said liquid rheostat and said wet well, said means for activating and deactivating said operating means comprises electrically operated valve means in an air passage of said pneumatic controller means, said variable control signal producing means comprises a potentiometer means operable to produce a variable current in a meter relay circuit means including a meter relay operable to open and close said electrically operated valve means in response to changes in current in said meter relay circuit means, and a tach generator means in said meter relay circuit means operably connected to said electric motor to produce current changes in said circuit means in response to speed changes in said motor, whereby fluctuations in the liquid level of said wet well within the operating range of said manometer control and liquid rheostat result in incremental changes in the speed of said electric motor.

9. A liquid manometer control comprising:
an elongate upstanding control housing,
an airtight manometer reservoir within a lower end of said housing including means for filling said reservoir with a manometer liquid,
a vertical float tube extending upwardly within said housing from an open lower end within said reservoir to an upper end opening above said reservoir,
a float movable vertically within said float tube upon changes in the level of manometer liquid within said tube,
a float wheel fixed to a first rotatable shaft within said housing above the upper end of said float tube,
flexible motion-transmitting line means trained about said float wheel and connected at one end to said float and at its opposite end to a counterweight outside said tube in a manner to rotate said float wheel and first shaft upon vertical movement of said float,
a second shaft rotatably mounted within said housing parallel to and below said first shaft, and means drivingly interconnecting said first and second shafts,
a plurality of control wheels removably mounted in side-by-side relationship on said second shaft for rotation therewith,
plural cam-type actuator means mounted to the rims of said control wheels so as to project radially outwardly from said rims,
plural control signal-producing means mounted on a control mounting means confronting the rims of said control wheels, each of said control signal-producing means being positioned on said mounting means for engagement with a selected one of said cam-type actuator means on one of said rims at a predetermined level of liquid within said float tube,
an air tube extending within said housing and into said reservoir at a position displaced from said float tube, said air tube being adapted for connection to a source of variable air pressure.

10. A manometer control according to claim 9 wherein siad plural cam-type actuator means includes at least one inclined plane cam actuator on a rim of one said control wheel for variable engagement with one of said signal-producing means comprising a variable signal-producing means, whereby the variable engagement of said inclined plane cam actuator with said variable signal-producing means can produce a varying output signal for variable control of a remote variable-function device.

11. A manometer control according to claim 9 including normally open valve means in said air tube means and operable under an abnormally high upstream air pressure from said variable source to close said air tube and thereby prevent the overflow of liquid from said float tube and operable upon return of said upstream air pressure to a normal range to reopen communication between said air tube and said reservoir.

12. A manometer control according to claim 9 wherein said cam-type actuator means are adjustable to different actuating positions along the circumference of said rims.

13. A manometer control according to claim 9 wherein said means drivingly interconnecting said first and second shafts is interchangeable to provide different drive ratios between said shafts and therefore different arcs of rotation of said control wheels for a given change of liquid level in said float tube.

14. A control according to claim 1 wherein said actuating means are circumferentially adjustable to different actuating positions.

* * * * *